United States Patent [19]

Olds et al.

[11] E Re. 30,722

[45] Reissued Aug. 25, 1981

[54] TOPPING FOR FROZEN DESSERTS AND METHOD OF MANUFACTURE

[75] Inventors: Dale F. Olds, Dublin; Arnold M. Allan, San Francisco; Charles H. Warren, South San Francisco, all of Calif.

[73] Assignee: Patent Technology, Inc., San Francisco, Calif.

[21] Appl. No.: 542

[22] Filed: Jan. 2, 1979

Related U.S. Patent Documents

Reissue of:

[64] Patent No.: 4,086,370
Issued: Apr. 25, 1978
Appl. No.: 767,291
Filed: Feb. 3, 1977

[51] Int. Cl.[3] ..... A23G 9/34

[52] U.S. Cl. ..... 426/613; 426/101; 426/306

[58] Field of Search ..... 426/613, 306, 101, 93, 426/103, 307

[56] References Cited

U.S. PATENT DOCUMENTS

| | | | |
|---|---|---|---|
| 2,191,352 | 2/1940 | Oprean | 426/101 |
| 2,457,110 | 12/1948 | Burbank et al. | 426/306 |
| 2,674,534 | 4/1954 | Carter | 426/306 |
| 3,199,984 | 8/1965 | Jensen et al. | 426/306 |
| 3,819,839 | 1/1974 | Pichel | 426/93 |
| 3,959,516 | 5/1976 | Warkentin | 426/306 |
| 4,017,645 | 4/1977 | Ziccarelli | 426/613 |

*Primary Examiner*—Jeanette M. Hunter
*Attorney, Agent, or Firm*—Flehr, Hohbach, Test, Albritton & Herbert

[57] ABSTRACT

An edible confection topping normally in liquid form which immediately hardens to form a brittle edible shell when applied to a frozen dessert (e.g., ice cream). The composition includes a normally liquid oil content and crystallized [emulsifiers] *material* which seed rapid crystallization and hardening of the oil when the temperature of the product is lowered by contact with the frozen dessert. Also a method of manufacture in which micro-crystalline emulsifier [is] *and stearine are* dispersed in a liquid mix of oil, sugar, corn syrup solids and milk solids. Cocoa or other flavoring materials are added along with coloring materials.

13 Claims, 1 Drawing Figure

TOPPING FOR FROZEN DESSERTS AND METHOD OF MANUFACTURE

Matter enclosed in heavy brackets [ ] appears in the original patent but forms no part of this reissue specification; matter printed in italics indicates the additions made by reissue.

BACKGROUND OF THE INVENTION

This invention relates generally to confection toppings for application to frozen desserts, and to methods for their manufacture.

Toppings of the confection type that are applied to frozen desserts are generally of liquid or semi-liquid consistency with a substantial moisture content (e.g., 20 to 30%) and consisting mainly of sugar syrup together with flavoring material such as chocolate or fruit solids and/or juices. Such compositions may have an oil (i.e., fat) content for providing a rich flavor, as for example, a content of the order of 5 to 10%. When applied to frozen desserts like ice cream, the topping may become more viscous at the lower temperatures to which it is chilled, but it remains essentially in liquid or plastic condition.

Confection compositions have been used for coating or enrobing frozen desserts, as for example compositions containing chocolate and sugar. Such compositions are specifically formulated to get a rapid, dry coating and are applied at temperatures of about 95° F. This requires keeping the coating composition in melted form at about 95° F. The coating hardens and dries in a few seconds upon contact with the frozen confection and permits wrapping in a continuous packaging line.

OBJECTS AND SUMMARY OF THE INVENTION

In general, it is an object of the present invention to provide a confection topping in fluid form which when applied at room temperature to frozen desserts like ice cream immediately hardens to form a brittle edible shell.

Another object of the invention is to provide such a topping which is relatively stable at room temperature, and which is of such consistency that it may be either poured upon the frozen dessert, or the dessert dipped in the composition.

Another object is to provide a topping which is very low in moisture content, high in fat content, and which after hardening is characterized by absence of graininess.

Another object is to provide a topping formulation which can be made in a variety of flavors.

Another object is to provide a method for commercial manufacture of the composition, and particularly a method which is economical and does not involve undue processing time.

In general, the product is a homogeneous blend that is fluid at room temperature. It contains a relatively high high oil or fat content (e.g., 44 to 53%), and a sugar content of from 28 to 38%. Preferably it contains some milk solids, and corn syrup solids, and various flavoring materials (e.g., cocoa) can be added. In addition it contains from 1.8 to 2.4% of hard crystallized emulsifiers having melting points of about 140° to 145° F. *together with crystallized stearine having a melting point of from 135° to 155° F.* The moisture content is low, being of the order of from 0.4 to 1.7%. Preferably the fat content is a blend of vegetable oils, one of which may be partially hydrogenated and another being refined coconut oil. The manufacturing process preferably involves blending the fats together with corn syrup solids and nonfat milk solids at an elevated temperature, cooling the mix, adding sugar with blending, introducing a crystallized emulsifier *and stearine* dispersion with blending, and then milling the mixture while at a temperature not in excess of about 100° F.

Additional objects and features of the invention will appear from the following description in which the preferred embodiments have been set forth in detail in conjunction with the accompanying drawing.

DESCRIPTION OF THE PREFERRED EMBODIMENTS

Figure 1:
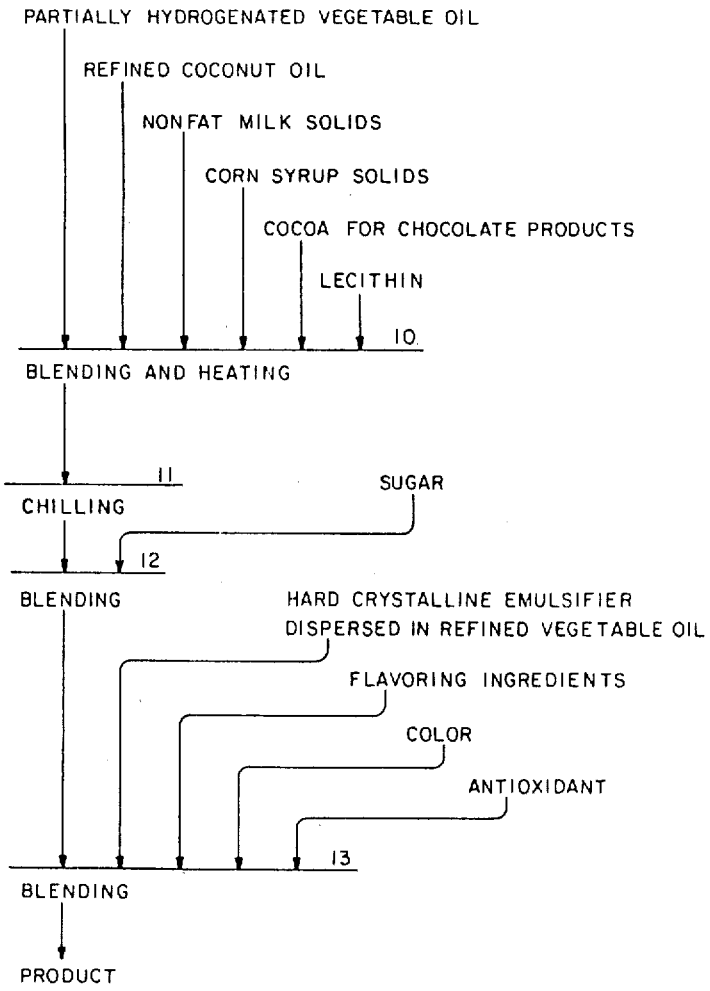
FIG. 1 is a flow diagram illustrating the preferred process.

The process as shown in FIG. 1 consists generally of supplying vegetable oils, nonfat milk solids, corn syrup solids, cocoa for chocolate products, and a small amount of surface active wetting agent like lecithin to step 10 where they are blended and heated to an elevated temperature of the order of about 160° to 170° F.

The blend is held at the elevated temperature for a period of the order of 5 minutes, after which it is promptly chilled to a temperature of the order of 100° to 115° F. Sugar is then added in the blending step 12, which further reduces the temperatures to about 90° to 100° F. The resulting mix is further blended in step 13 with a hard crystallized emulsifier *and stearine* dispersed in a refined vegetable oil, together with additional flavoring ingredients and color that may be desired. Mainly by virtue of heat exchange between the mix from step 12 and the ingredients added in step 13, this further reduces the temperature of the mix to about 85° to 90° F. The mix is blended and milled in step 13 by use of suitable blending and milling equipment. Milling results in some increase in temperature (e.g., 10 to 15% F.) but does not increase the temperature above a maximum of 100° F. This temperature limitation is assured by having the mix at a temperature of about 85° to 90° F. at the time milling is commenced, and is below the melting temperatures of the crystallized emulsifier and fat contained in the emulsifier *and stearine* dispersion. The product is then ready for filling containers.

As a suitable emulsifier, we have employed mono and diglycerides having melting points as high as 140° F. to 145° F. and in the form of relatively fine micro-crystals. The crystallized emulsifier [is] *and stearine are* dispersed in a suitable vegetable oil for introduction in step 13, such as an oil that is 95% liquid at 70° F., thereby facilitating blending with the other ingredients and maintaining the emulsifier *and stearine* in solid microcrystalline form. After blending and milling in step 13 the resulting fluid product is immediately suitable for packaging and use. In other words, no ageing is required to attain stabilization.

Blending in steps 12 and 13 can be carried out by the use of conventional blending equipment. Milling after blending in step 13 serves to break up crystal agglomerates and to impart smoothness to the product and may be carried out by a colloid type of mill.

Instead of introducing all of the hard crystalline emulsifier in step 10, a small amount, such as from 0.2 to 0.3%, may be introduced in step 10 before heating. Heating to a temperature of about 165° F. serves to melt such emulsifier, although it recrystallizes later in the process when the blend is chilled.

The vegetable oil or fats selected for use in the process are such that the final product is fluid at ambient room temperature above about 65° F. with a limited amount of fat in crystalline form. The oils should be bland with respect to flavor, be odorless, and be relatively stable. The elevated temperature in step 10 ensures homogeneous blending and in addition provides for pasteurization and elimination of any bacterial contamination. Chilling in steps 11 and 12 to a lower temperature level prevents dissolution of the crystalline [emulsifier] *material* introduced in step 13, which would occur at the higher temperature level of the material. Also this lowered temperature level together with further lowering of the temperature when the additional ingredients are added in step 13, assures a temperature level of the final milled product that does not exceed the maximum of about 100° F. The emulsifier *and stearine* introduced in step 13 remains in crystalline form, with only a minimum amount of dissolution.

The milk solids employed may be nonfat spray dried milk or spray dried whey solids. When whey solids are employed, we prefer to use a whey protein concentrate with at least 35% protein and with reduced mineral content to minimize salty flavor. Such whey products are disclosed in U.S. Pat. Nos. 3,615,664 dated Oct. 26, 1971 and 3,447,930 dated June 3, 1969. Blends of whey and nonfat milk solids can also be used.

The sugar content should be powdered sucrose, such as is used by confectioners, or a blend of powdered sugar and corn sugar or dextrose.

The composition of the product except for peanut butter may be as follows:

| | General | Optimum |
|---|---|---|
| Vegetable oil | 44 to 53 | 46 to 51 |
| Sugar (powdered sucrose) | 28 to 38 | 30 to 36 |
| Milk Solids | 0 to 9 | 1 to 8 |
| Corn Syrup Solids | 4 to 10 | 4.5 to 8.5 |
| Crystallized Emulsifer *and Stearine* | 1.8 to 2.4 | 2.0 to 2.25 |
| Moisture | 0.5 to 1.2 | 0.7 to 1.0 |
| Flavor Additives (e.g., cocoa) | 0.3 to 13 | 0.3 to 11 |

Composition for peanut butter is given in Example 2.

The product produced by the process remains fluid at ambient temperatures above 65° F., and it can be stored for long periods of time without deterioration. When it is applied to a frozen dessert, as for example to a scoop of ice cream on a cone or to a dish of ice cream, it instantly hardens and forms a brittle edible shell. Hardening occurs at such a rapid rate that there is substantially no drippage or run-down of the topping about the sides of the cone.

According to our observations, the rapid hardening of the topping is due to the seeding effect of the crystallized emulsifier *and stearine* present in the product. In other words, when the composition is chilled to a temperature below about 32° F., crystallization of fat is seeded whereby the composition is converted almost instantly from a fluid to a brittle solid state.

Examples of the invention are as follows:

EXAMPLE 1

The vegetable oils supplied to the blending step 10 comprised a bland refined hydrogenated vegetable oil which was fluid at room temperature and which was odorless and relatively stable. More specifically, one part of the oil employed was a product manufactured by the Glidden-Durkee Division of S.C.M. Corporation, known by the trade name of "Durkex 500". Its solid fat content at 70° F. was about 3 to 5%. The other part of the oil content supplied to step 10 was a refined coconut oil likewise manufactured by the Glidden-Durkee Division of S.C.M. Corporation and sold under the trade name of "Konut 76". This oil is liquid at a temperature above about 76° F. It has a low degree of unsaturation and a relatively narrow melting range. Also it has a bland sweet flavor. The milk solids employed were nonfat dry milk. The sugar was powdered sugar (sucrose), such as is used in the confection industry. The corn syrup solids was a 24 D.E. product. The additive used for flavoring was cocoa. The crystallized emulsifier [was] *and stearine were* dispersed in [the] oil and was procured from the Glidden-Durkee Division of S.C.M. Corporation, being known by the trade designation of "Durkee B-4A Fluid Shortening". *This product comprised 6% of microcrystalline hard fat, namely stearine having a melting point of from 135° to 155° F., and 4% microcrystalline mono and diglyceride emulsifiers having melting points of from 140° to 145° F., dispersed in 90% refined vegetable oil, namely soya oil.* The emulsifier was hard mono and diglycerides. Ten percent of the emulsifier *and stearine* was dispersed in the oil, and the oil was a refined vegetable oil *(namely soya oil)* containing about 3% solid fat at 70° F. The Dur-Em 117 emulsifier is similar to that dispersed in the B-4A. The proportioning of the ingredients was as follows:

| | % |
|---|---|
| Konut 76 | 13.57 |
| Durkex 500 | 14.30 |
| Powdered Sugar | 35.945 |
| Corn Syrup Solids, 24 D.E. | 4.71 |
| Cocoa | 8.71 |
| Lecithin | 0.4 |
| Nonfat Dry Milk | 3.34 |
| Durkee B-4A Fluid Shortening | 18.57 |
| Dur-Em 117 Emulsifier | 0.2 |
| Chocolate Flavoring | 0.2 |
| Powdered Vanilla | 0.03 |
| Powdered Salt | 0.01 |
| Antioxidant | 0.015 |

The procedure was generally the same as described with reference to FIG. 1. The vegetable oils, nonfat milk solids, corn syrup solids, cocoa and lecithin were blended, heated to a temperature of about 165° F., and held at that temperature for a period of 5 minutes to ensure pasteurization. This mix was then promptly chilled to a temperature of about 100° to 115° F. The sugar was then added, which further reduced the temperature to about 90° to 100° F. This mix was then blended with oil in which the microcrystalline emulsifier [was] *and stearine were* dispersed, together with the flavoring ingredients, with further reduction of the temperature to about 85° to 90° F. Milling the mix produced the final product and caused a temperature rise limited to a maximum of about 100° F.

EXAMPLE 2

Peanut butter was as a flavoring ingredient. The basic ingredients and the manufacturing procedure was essentially the same as for chocolate. The natural peanut butter was introduced with the B-4A shortening. The proportion of the ingredients was as follows:

| | % |
|---|---|
| Konut 76 | 8.91 |
| Durkex 500 | 15.97 |
| Durkee B-4 Fluid Shortening | 14.74 |
| Powdered Sugar | 22.449 |
| Corn Syrup Solids,24 D.E. | 6.28 |
| Nonfat Dry Milk | 6.0 |
| Durkee Dur-Em 117 Emulsifier | 0.22 |
| Lecithin | 0.22 |
| Antioxidant | 0.011 |
| Peanut Butter, natural | 25.0 |
| Color | 0.2 |

EXAMPLE 3

Butterscotch was used as a flavoring ingredient. The basic ingredients and processing procedure were essentially the same as for chocolate. The flavoring ingredients, color and antioxidants were added with the B-4A shortening in the blending step 13. The proportion of the ingredients was as follows:

| | % |
|---|---|
| Konut 76 | 11.80 |
| Durkex 500 | 21.15 |
| Durkee B-4A Fluid Shortening | 19.52 |
| Powdered Sugar | 29.745 |
| Corn Syrup Solids,24 D.E. | 8.32 |
| Nonfat Dry Milk | 7.93 |
| Durkee Dur-Em 117 Emulsifier | 0.3 |
| Lecithin | 0.3 |
| Antioxidant | 0.015 |
| Color | 0.23 |
| Powdered Salt | 0.01 |
| Butterscotch Flavor | 0.68 |

What is claimed is:

1. An edible coating composition which is a homogeneous blend that is fluid at room temperature and which hardens as a brittle edible shell when applied to a frozen dessert consisting of from 44 to 53% refined edible oil that is substantially entirely liquid at 70° F., from 28 to 38% sugar, from 0 to 9% milk solids, from 4 to 10% corn syrup solids, from 1.8 to 2.4% hard crystallized emulsifier *and stearine, the emulsifier being* selected from the group consisting of monoglycerides, diglycerides and mixtures thereof, from 0.5 to 1.2% moisture, and the remainder flavoring additives.

2. A product as in claim 1 in which the emulsifiers consist of hard crystallized mono and diglycerides having a melting point of about 140° to 145° F.

3. A product as in claim 1 in which the oil consists of partially hydrogenated vegetable oil that is fluid at room temperature and which is stable, bland and odorless, and refined coconut oil having a bland sweet flavor, and which is fluid at temperatures above 65° F.

4. A process for the manufacture of an edible topping which hardens as a brittle edible shell when applied to a frozen dessert, the process comprising the heat treatment of a blend comprising vegetable oil that is fluid at room temperature, nonfat milk solids, corn syrup solids and lecithin, the heat treatment being at a temperature and for a time to effect pastuerization, adding sugar to the mix, chilling the mix and blending the same with hard crystallized emulsifier *and stearine, the emulsifier being* selected from the group consisting of monoglycerides, diglycerides and mixtures thereof dispersed in an edible oil, whereby the crystallized emulsifier [is] *and stearine are* homogeneously dispersed in and remain[s] as such in the mix.

5. A process as in claim 4 in which the vegetable oil consists of partially hydrogenated vegetable oil with 3 to 5% solid fat at 70° F., together with refined coconut oil that is fluid at temperatures above about 76° F.

6. A process as in claim 4 in which the hard crystallized emulsifier is selected from the group consisting of mono and diglycerides and combinations thereof having melting points of about 140° to 145° F.

7. A process as in claim 4 in which the crystallized emulsifier [is] *and stearine are* introduced into the mix together with a refined vegetable oil in which the crystallized emulsifier [is] *and stearine are* dispersed, the refined vegetable oil being one that is approximately 95% liquid at 70° F.

8. A process as in claim 4 in which the mix consisting of oil, milk solids and sugar is cooled to a temperature of about 90° to 100° F. before introducing the crystallized emulsifier *and stearine.*

9. A process as in claim 4 in which the mix before addition of the sugar is at a temperature of the order of 160° to 170° F. and is chilled to a temperature of about 90° to 115° F. before the sugar is added, addition of the sugar and the [emulsifier] dispersion *of emulsifier and stearine* serving to further reduce the temperature to about 85° to 90° F., and then milling the mix at a temperature not in excess of about 100° F.

10. A process as in claim [6] 5 in which dry powdered cocoa is blended with the milk solids and sugar and the blend mixed with the oil before adding the *stearine and* crystallized emulsifier.

11. A process for the manufacture of an edible topping which hardens as a brittle edible shell when applied to a frozen dessert, the processing comprising blending a vegetable oil that is fluid at room temperature with nonfat milk solids, corn syrup solids and lecithin at a temperature of about 160° to 170° F., holding the blend at such temperature for a period of the order of 5 minutes, chilling the blend to a temperature of the order of 100° to 115° F., adding sugar to the blend whereby the temperature of the blend is reduced to about 90° F. to 100° F., blending [a] hard crystalline emulsifier *and stearine* with the mix, the emulsifier being selected from the group consisting of mono and diglycerides and combinations thereof having melting points of 140° to 150° F., [and] *the stearine having a melting point of from 135° to 155° F., said stearine and emulsifier* being dispersed in a refined vegetable oil whereby the temperature of the mix is further reduced to about 85° to 90° F., and then milling the mix without increasing the temperature above a maximum of about 100° F., the proportions of the ingredients being from 44 to 53% refined edible oil that is substantially entirely liquid at 70° F., from 20 to 38% sugar, from 0 to 9% milk solids, from 4 to 10% corn syrup solids, from 1.8 to 2.4% of the hard crystallized emulsifier *and stearine* and from 0.5 to 1.2% moisture.

*12. An edible coating composition which is a homogeneous blend that is fluid at room temperature and which hardens as a brittle edible shell when applied to a frozen dessert consisting of from 44 to 53% refined edible oil that is substantially entirely liquid at 70° F., from 28 to 38% sugar, from 0 to 9% milk solids, from 4 to 10% corn syrup solids, from 1.8 to 2.4% of a material consisting of crystallized stearine having a melting point of 135°–155° F. and*

*hard crystalline emulsifier selected from the group consisting of monoglycerides, diglycerides and mixtures thereof, from 0.5 to 1.2% moisture, and the remainder flavoring additives.*

*13. A process for the manufacture of an edible topping which hardens as a brittle edible shell when applied to a frozen dessert, the process comprising the heat treatment of a blend comprising vegetable oil that is fluid at room temperature, nonfat milk solids, corn syrup solids and lecithin, the heat treatment being at a temperature and for a time to effect pasteurization, adding sugar to the mix, chilling the mix and blending the same with material consisting of crystallized stearine having a melting point of 135°-155° F., and hard crystalline emulsifier selected from the group consisting of monoglycerides, diglycerides and mixtures thereof dispersed in an edible oil, whereby the crystallized emulsifier and stearine are homogeneously dispersed in and remain as such in the mix.*

* * * * *